United States Patent [19]
Asanovic

[11] Patent Number: 5,805,875
[45] Date of Patent: Sep. 8, 1998

[54] VECTOR PROCESSING SYSTEM WITH MULTI-OPERATION, RUN-TIME CONFIGURABLE PIPELINES

[75] Inventor: Krste Asanovic, Berkeley, Calif.

[73] Assignee: International Computer Science Institute, Berkeley, Calif.

[21] Appl. No.: 713,748

[22] Filed: Sep. 13, 1996

[51] Int. Cl.⁶ ........................................................ G06F 9/30
[52] U.S. Cl. ............................................ 395/563; 395/376
[58] Field of Search ..................................... 395/376, 563

[56] References Cited

U.S. PATENT DOCUMENTS

| | | | |
|---|---|---|---|
| 4,128,880 | 12/1978 | Cray, Jr. .................................... | 364/200 |
| 4,589,067 | 5/1986 | Porter et al. ............................. | 364/200 |
| 5,123,095 | 6/1992 | Papadopoulos et al. ................ | 395/375 |
| 5,542,059 | 7/1996 | Blomgren ................................. | 395/376 |
| 5,542,109 | 7/1996 | Blomgren et al. ....................... | 395/800 |
| 5,544,337 | 8/1996 | Beard et al. ............................. | 395/376 |
| 5,598,546 | 1/1997 | Blomgren ................................. | 395/385 |

OTHER PUBLICATIONS

Thirumalaiswamy et al., "Design and Analysis of Generalized Dynamic Pipeline for Scientific Functions", Circuits and systems, 1993 IEEE Midwest Symposium, pp. 1515–1518.

*Primary Examiner*—Robert B. Harrell
*Assistant Examiner*—Saleh Najjar
*Attorney, Agent, or Firm*—Gary S. Williams; Flehr Hohbach Test Albritton & Herbert

[57] ABSTRACT

A data processing system contains both a scalar processor and a vector processor. The vector processor contains a plurality of functional units, each of which contains a plurality of parallel pipelines. Each of the pipelines contains a plurality of arithmetic and logic units (ALUs) connected via a plurality of data paths, such that data can be communicated between the ALUs during the execution of a vector instruction by the vector functional unit containing the pipeline. The operation performed by each of the cascaded ALUs and the paths through which data is to be communicated between the ALUs during the execution of a vector instruction can be controlled by configuration values held in a scalar register named by the vector instruction. Through the use of this technique, multiple operations upon sets of vector data may be specified in a single short vector instruction, and further, the configuration of the pipelines can be determined dynamically in response to program input.

9 Claims, 7 Drawing Sheets

| 31 26 | 25 21 | 20 16 | 15 11 | 10 | 9 5 | 4 0 |
|---|---|---|---|---|---|---|
| COP2 010010 | FXAVV 11000 | vt | rd | SV 0 | vw | vd |
| 6 | 5 | 5 | 5 | 1 | 5 | 5 |

| 31 26 | 25 21 | 20 16 | 15 11 | 10 | 9 5 | 4 0 |
|---|---|---|---|---|---|---|
| COP2 010010 | FXAVS 11001 | rt | rd | SV 0 | vw | vd |
| 6 | 5 | 5 | 5 | 1 | 5 | 5 |

| 31 26 | 25 21 | 20 16 | 15 11 | 10 | 9 5 | 4 0 |
|---|---|---|---|---|---|---|
| COP2 010010 | FXAVS 11001 | rt | rd | VS 1 | vw | vd |
| 6 | 5 | 5 | 5 | 1 | 5 | 5 |

| 31 26 | 25 21 | 20 16 | 15 11 | 10 | 9 5 | 4 0 |
|---|---|---|---|---|---|---|
| COP2 010010 | FXSVV 11010 | vt | rd | SV 0 | vw | vd |
| 6 | 5 | 5 | 5 | 1 | 5 | 5 |

| 31 26 | 25 21 | 20 16 | 15 11 | 10 | 9 5 | 4 0 |
|---|---|---|---|---|---|---|
| COP2 010010 | FXSVS 11011 | rt | rd | SV 0 | vw | vd |
| 6 | 5 | 5 | 5 | 1 | 5 | 5 |

| 31 26 | 25 21 | 20 16 | 15 11 | 10 | 9 5 | 4 0 |
|---|---|---|---|---|---|---|
| COP2 010010 | FXSVS 11011 | rt | rd | VS 1 | vw | vd |
| 6 | 5 | 5 | 5 | 1 | 5 | 5 |

| 31 26 | 25 21 | 20 16 | 15 11 | 10 | 9 5 | 4 0 |
|---|---|---|---|---|---|---|
| COP2 010010 | FXMVV 11100 | vt | rd | VS 0 | vw | vd |
| 6 | 5 | 5 | 5 | 1 | 5 | 5 |

| 31 26 | 25 21 | 20 16 | 15 11 | 10 | 9 5 | 4 0 |
|---|---|---|---|---|---|---|
| COP2 010010 | FXMVS 11101 | rt | rd | VS 0 | vw | vd |
| 6 | 5 | 5 | 5 | 1 | 5 | 5 |

| 31 26 | 25 21 | 20 16 | 15 11 | 10 | 9 5 | 4 0 |
|---|---|---|---|---|---|---|
| COP2 010010 | FXMVS 11101 | rt | rd | SV 1 | vw | vd |
| 6 | 5 | 5 | 5 | 1 | 5 | 5 |

FIG. 5

Configuration Register 105

| Bit | Name |
|---|---|
| 31 | noclip |
| 30 | lures |
| 29–26 | lufunc |
| 25 | au |
| 24 | bu |
| 23–21 | wcond |
| 20 | shlza |
| 19 | shrl |
| 18 | shrv |
| 17–13 | shram |
| 12 | sepsham |
| 11 | shrst |
| 10 | shrnr |
| 9 | shlnr |
| 8–7 | clipam |
| 6 | 0 |
| 5 | shlv |
| 4–0 | shlam |

VECTOR PROCESSING SYSTEM WITH MULTI-OPERATION, RUN-TIME CONFIGURABLE PIPELINES

The present invention relates generally to data processing systems that can execute vector instructions, and particularly to a new pipelined architecture for performing a program determinable sequence of operations on vector data.

BACKGROUND OF THE INVENTION

Computers that include vector processing capabilities have proven successful in providing high computational throughput for many applications. Such computers typically include a scalar processor together with a separate vector processor. In some cases, the vector processing capability is an optional addition to an existing scalar processor, where the vector processing unit extends the base scalar instruction set with a further set of vector processing instructions. It is desirable to maintain the instruction format of the base scalar processor when adding a vector processing extension, so as to minimize the complexity added to the base scalar processor control logic.

Vector processors can be divided into two classes: those that read and write vector operands and results from memory, so called vector memory-memory architectures, and those that read and write vector operands and results from vector registers, so called vector register architectures. Vector register architectures have proven more successful due to their lower memory bandwidth requirements. A commercial example is disclosed in U.S. Pat. No. 4,128,880 by Seymour Cray assigned to Cray Research Inc. For brevity, we restrict the following discussion to vector-register machines, however, the present invention can also be applied to vector memory-memory machines.

The vector processor may include several vector functional units, each of which may be composed of several parallel pipelines. A single vector instruction may take many cycles to complete execution, producing one or more results per cycle depending upon the number of parallel pipelines in the vector functional unit executing the instruction. A subsequent vector instruction may be issued to a second vector functional unit so that execution of both vector instructions is overlapped in time.

Vector throughput can be increased by adding more parallel pipelines to each vector functional unit. This requires considerable extra circuitry, both to add the new pipelines and to interconnect them to the memory subsystem. Vector throughput can also be increased by adding more vector functional units. This also requires considerable extra circuitry for the new vector functional unit, for the extra control logic to manage the execution of a further concurrent vector instruction, and for the enlarged interconnection network needed to supply operands from a central vector register file.

A third option to increase vector throughput is to perform multiple operations for each set of operands within one vector instruction. A vector pipeline may contain several physically distinct ALU blocks, for example, one for performing logical operations, one for performing shift operations, and another for performing addition operations. In conventional operation, the output of only one of these ALU units is selected to form the result of the pipeline. With a small increase in pipeline circuitry it is possible to interconnect these ALUs and perform multiple operations on each set of operands within one vector instruction.

One drawback of performing multiple operations within one vector instruction is that it increases the number of control bits needed to specify the operations to be performed. When adding a vector instruction set extension to an existing scalar instruction set architecture, it may not be possible to extend the length of instructions to accommodate the extra control bits.

One method of controlling a configurable vector pipeline disclosed in U.S. Pat. No. 4,589,067, stores the configuration values in a separate microcode store that is sequenced by the control unit executing the vector instruction. This method has the disadvantage of requiring a separate expensive microcode store, that must have extra read ports added for each additional vector functional unit. If the microcode store is not writable by user programs, then users cannot dynamically change the pipeline configuration to match their program needs. If the microcode store is writable, the machine's operating system must either save and restore the microcode when switching between different user processes adding considerably to context switch times, or provide space for multiple copies of the microcode, adding considerably to machine expense.

Another method of controlling a configurable pipeline is disclosed in U.S. Pat. No. 5,123,095. A separate configuration register is provided mapped into the scalar processor's address space. A disadvantage of this approach is that changing the configuration requires an intervening memory write operation that limits the rate at which different vector operations can be started. In addition, in this scheme the configuration register indexes into a microcode store that provides the actual configuration control bits for the pipeline, and so suffers the same disadvantages described previously for U.S. Pat. No. 4,589,067.

It is therefore an object of the present invention is to provide a vector processor whose pipeline configuration can be efficiently changed from one vector operation to the next.

SUMMARY OF THE INVENTION

This present invention controls the configuration of a vector functional unit's pipelines with the value held in a scalar register named by the vector instruction. This invention allows multiple operations to be specified within a single vector instruction without requiring a separate microcode store, and without changing the instruction format of the base scalar processor. Two sequential vector instructions can name two different scalar configuration registers, thus allowing the pipeline to be dynamically reconfigured without extra intervening reconfiguration instructions. The configuration values are assembled in scalar registers using normal scalar instructions. This allows the configuration to be computed at run-time to allow the pipelines to adapt processing according to program input values.

BRIEF DESCRIPTION OF THE DRAWINGS

Additional objects and features of the invention will be more readily apparent from the following detailed description and appended claims when taken in conjunction with the drawings, in which:

DESCRIPTION OF THE PREFERRED EMBODIMENTS

Figure 1:
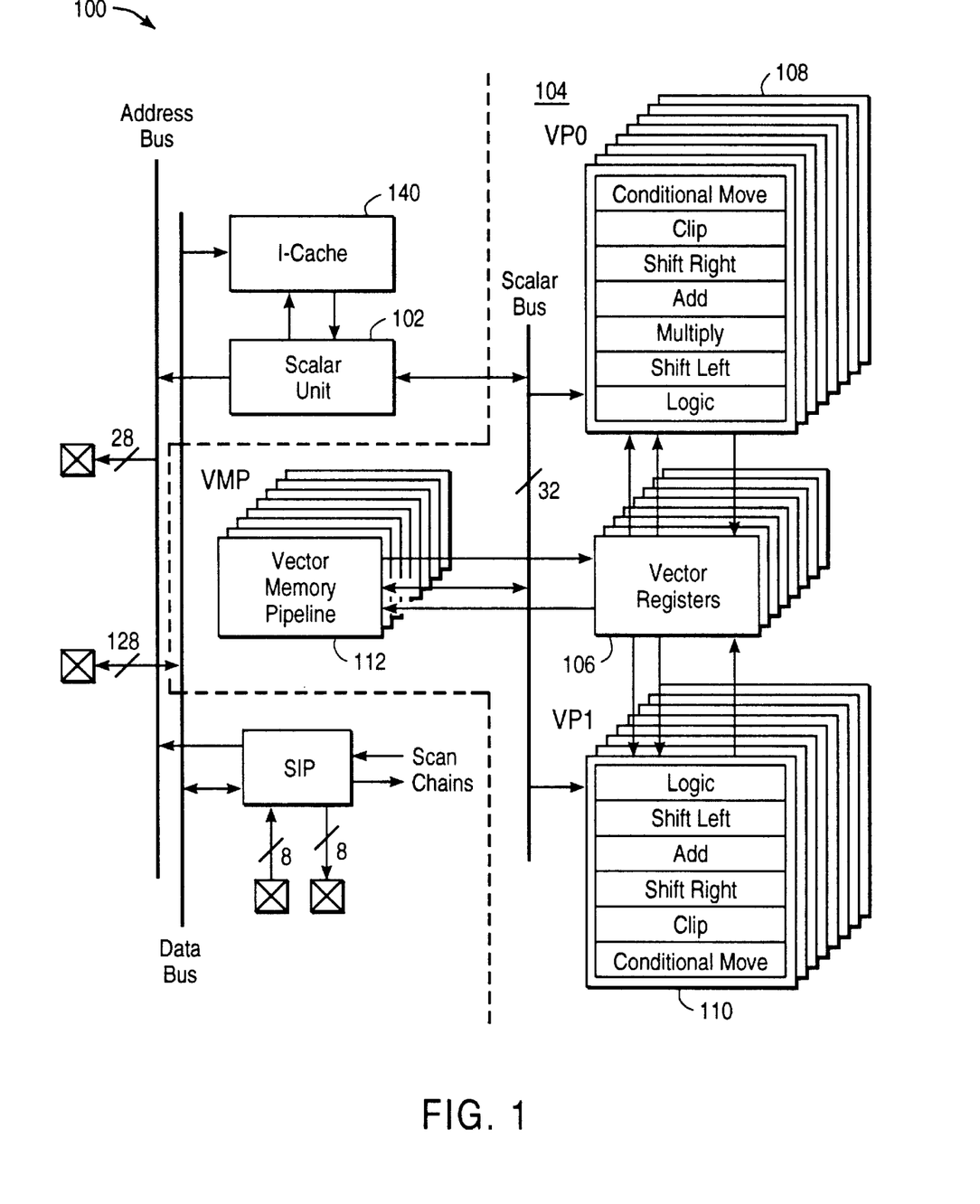
FIG. 1 is a block diagram of a data processor including a vector processor having a two vector arithmetic functional units.
Figure 2:
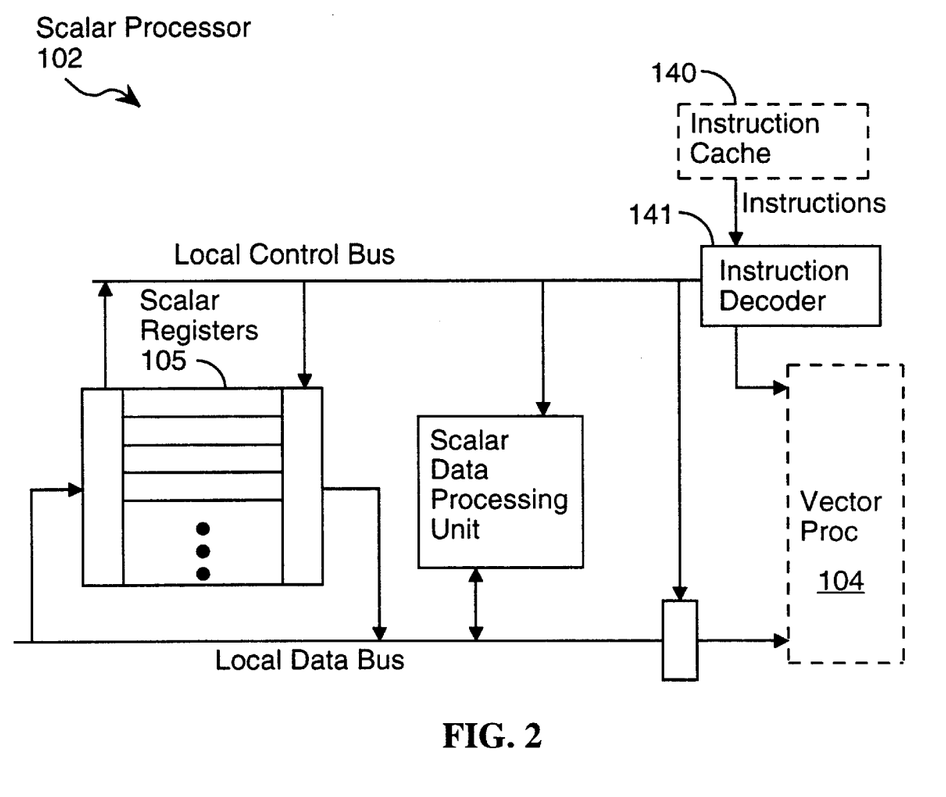
FIG. 2 is a simplified block diagram of a scalar processor.

Referring to FIG. 1, there is shown a functional block diagram of a vector processing system 100 according to the present invention. The vector processing system has a scalar processor 102 (shown in more detail in FIG. 2) and a vector processor 104. The scalar processor 102 includes a set of general purpose scalar registers 105 (see FIG. 2), used both for scalar computation and to provide operands and pipeline configuration values for the vector processor. In the preferred embodiment, there are at least thirty-two scalar registers 105 that can be used to store pipeline configuration values. More generally, a vector processing system should preferably include at least eight registers that can be used to store pipeline configuration values, although larger numbers of such registers increase programming flexibility and efficiency.

The vector processor 104 contains a vector register file 106, and two vector arithmetic functional units, VP0 108 and VP1 110, and a vector memory pipeline functional unit, VMP 112. Each of the vector functional units, VP0, VP1, and VMP, contains eight parallel pipelines and so can each process up to eight data units (e.g., data words of 32 bits each) to produce up to eight results per cycle.

Figure 3:
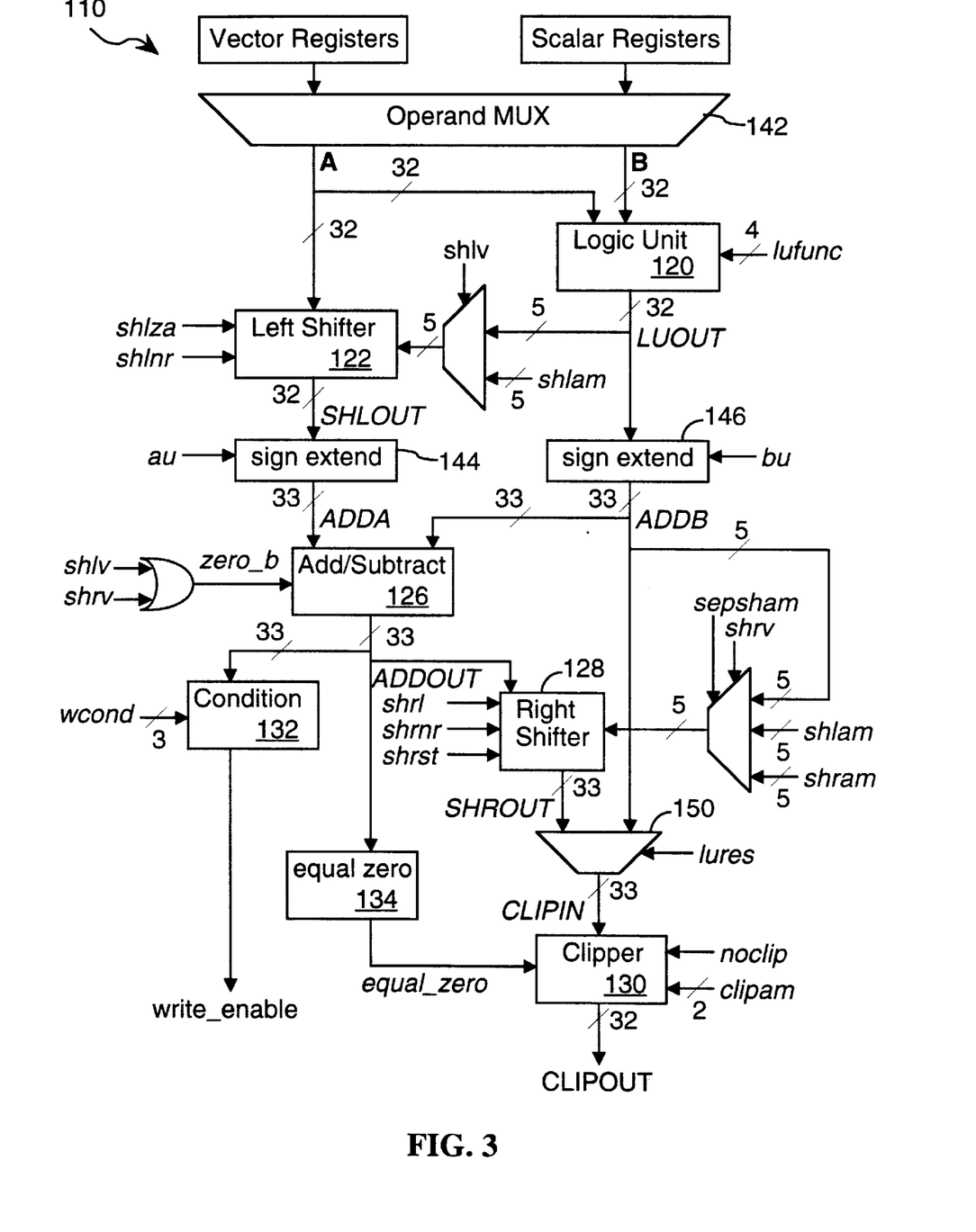
FIG. 3 is a schematic representation of the pipeline structure that can be controlled by configurable add and subtract instructions.
Figure 4:
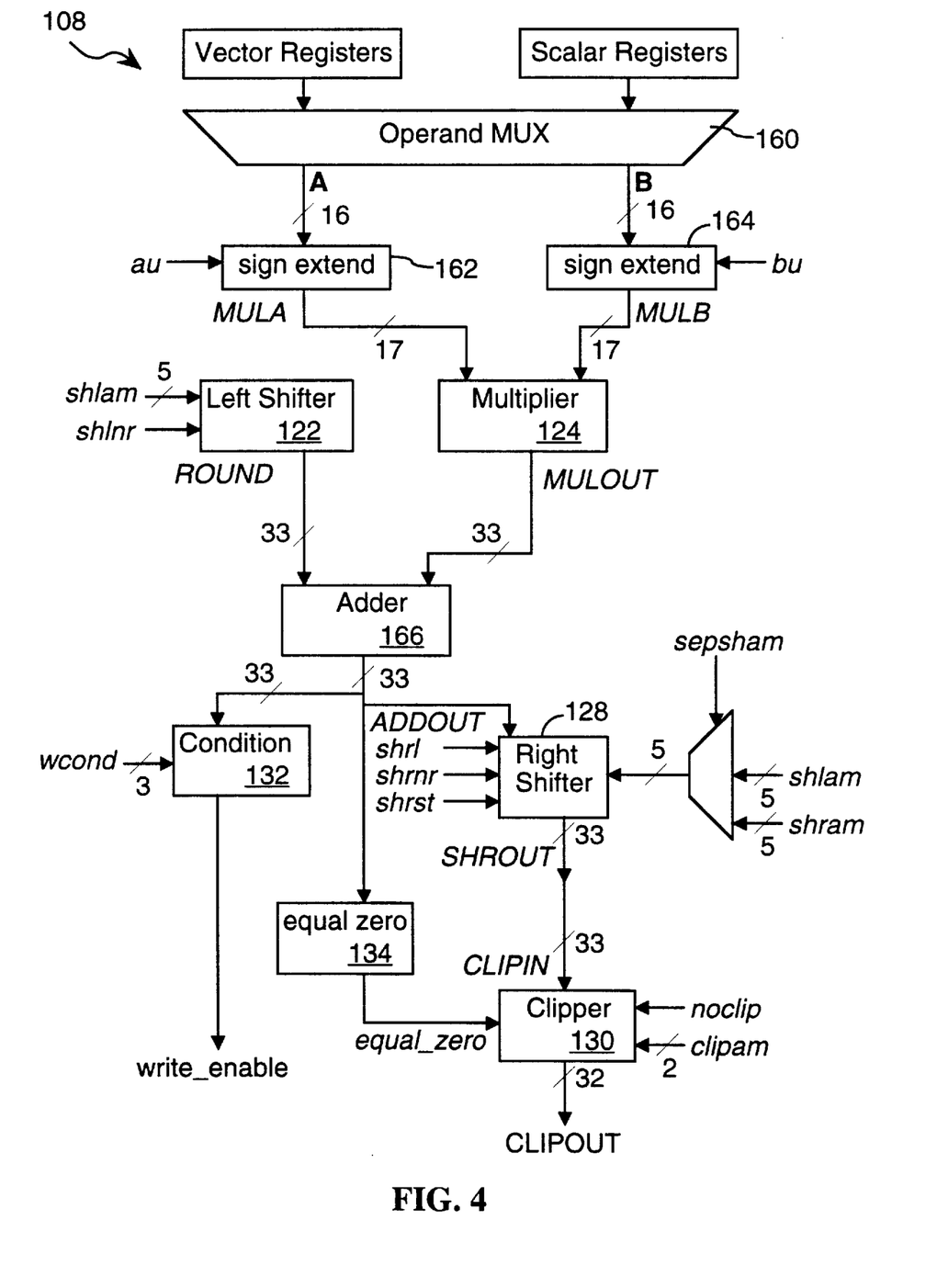
FIG. 4 is a schematic representation of the pipeline structure that can be controlled by configurable multiply instructions.

As will be discussed in more detail below, the vector arithmetic functional unit VP0 108 (as shown in FIG. 4) contains a 32-bit bitwise logical unit 120, a 32-bit shift left unit 122, a 17-bit by 17-bit integer multiplier 124, a 33-bit integer adder 126, a 33-bit shift right unit 128, a 33-bit to 32-bit, 16-bit, or 8-bit saturation or clipping unit 130, and a 33-bit condition evaluation circuit 132 to control selective writeback of results. The vector arithmetic functional unit VP1 110 (shown in FIG. 3) contains the same units as VP0, except that it lacks the integer multiplier 124. The vector memory pipeline VMP 112 executes unit stride, constant stride, and indexed load and store instructions to move data values between vector registers and memory. VMP 112 supports transfers of signed and unsigned, 8 bit, 16 bit and 32 bit integer values. In the preferred embodiment, the scalar and vector processors are manufactured together on a single integrated circuit.

There are a set of three vector flag registers, vcond, vovf, and vsat. The flag registers contain a single bit for each element within a vector register. The vcond (vector condition) flag register bits are set according to the results of vector comparison instructions. The vovf (vector overflow) bits are sticky bits that are set whenever an integer overflow occurs at the corresponding element position. The vsat (vector saturation) bits are sticky bits that are set whenever a saturation occurs at the corresponding element position, or when a condition is true during the execution of multi-operation vector instruction as described below. The flag registers can be read and written by the scalar processor.

Instructions are fetched from an instruction cache 140, and both vector and scalar instructions are decoded by an instruction decoder 141 in the scalar processor 102. Vector instructions are added as an extension of the base scalar processor instruction set and adopt the same fixed 32-bit wide format to simplify control of the scalar processor. During decode of all instructions, the scalar processor 102 fetches from the scalar registers 105 scalar values that will either form scalar operands for scalar instructions, or scalar operands and pipeline configuration values for the vector processor 104.

When a vector arithmetic instruction is decoded, it is dispatched to one of the free vector arithmetic functional units for execution. Vector arithmetic instructions can either be one of a set of predefined vector arithmetic instructions performing one basic operation for each set of vector element operands, or a configurable pipeline instruction that performs multiple operations on each set of vector element operands. Both the predefined base operations and the configurable pipeline operations are decoded into a common set of pipeline control signals before being passed to the vector functional unit controller for execution. In this manner, only a single vector instruction decoder 141 (see FIG. 2) is required regardless of the number of vector functional units, and each vector functional unit's controller 143 (see FIG. 7) need only apply the pipeline control signals to the appropriate pipeline stage in the right cycle to execute all the different forms of vector instruction.

Figure 5:
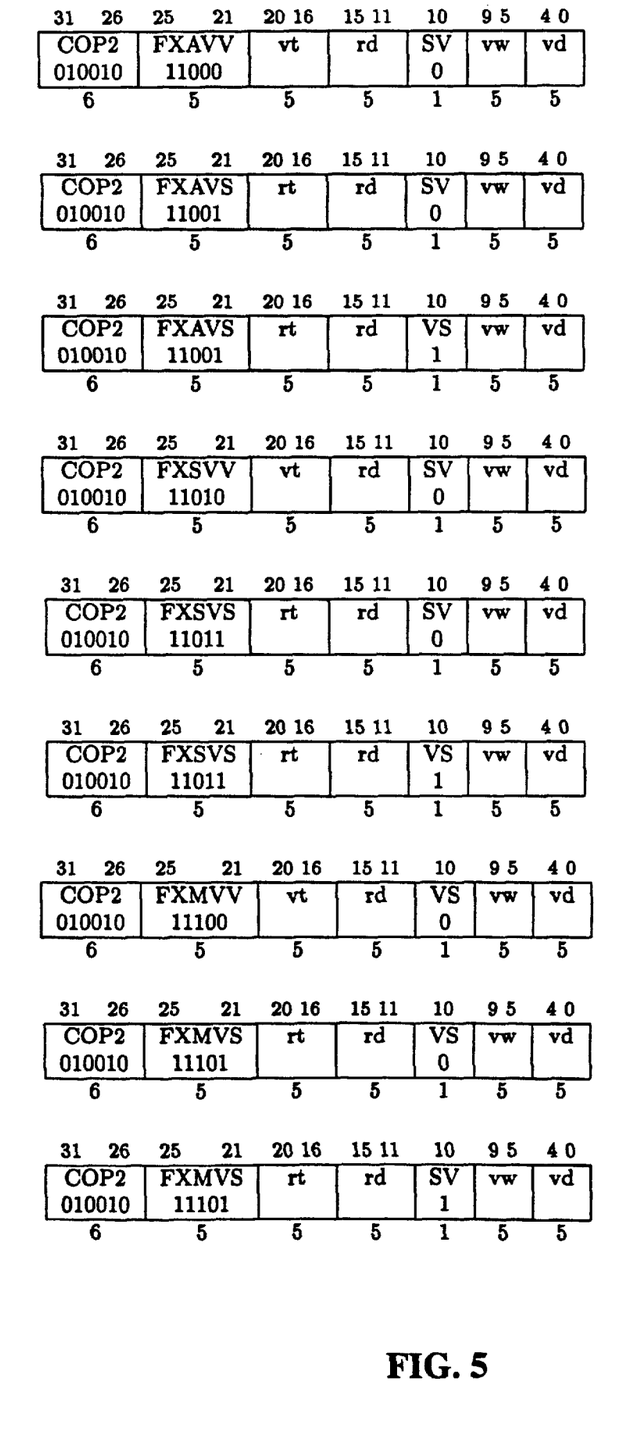
FIG. 5 depicts the instruction formats for a number of vector processing operations.

In the preferred embodiment there are three machine instructions that allow a variable pipeline configuration. These are the named fxadd, fxsub, and fxmul. Each of these three instructions has four register operands. All take one vector register as the first source operand, a vector register or a scalar register as the second source operand, a vector register as a result destination, and a scalar register to control the pipeline configuration. Each of fxadd, fxsub, and fxmul have three variants, denoted by the suffices .vv, .vs, .sv, to encode the vector-vector, vector-scalar, or scalar-vector form of the instruction. The format of these nine variants of the three basic instructions is shown in FIG. 5. The instruction format is the same fixed 32-bit wide format as the base scalar processor, in this case the scalar processor is compatible with the MIPS RISC architecture described in the book "MIPS RISC Architecture" by Kane and Heinrich.

For each of these instructions, bits 26 through 31 encode that these are vector unit operations, which are all mapped to the coprocessor 2 opcode space defined in the MIPS architecture. Bits 21 through 25 select one of the vector instructions. Here we describe only the vector instructions that allow the pipelines to be configured to perform multiple operations on each set of data operands. There are other vector instructions that execute only a single operation per set of data operands. The five bit wide field "vd" in bits 0 through 4 encodes the first vector register source operand, the five bit wide field "vw" in bits 5 through 9 encodes the vector register destination, the five bit wide field "vt" or "rt" in bits 16 through 20 encodes either the second vector register source operand or a scalar register that supplies the source operand. Bit 10 selects between vector-scalar and scalar-vector versions of the instruction where applicable. Bits 11 through 15, labeled "rd", specify the scalar register 105 that holds the pipeline configuration data. Since five bits specify the scalar register used as the pipeline configuration register for the instruction, up to thirty-two of the scalar registers 105 can be used to store pipeline configuration control values.

Figure 6:
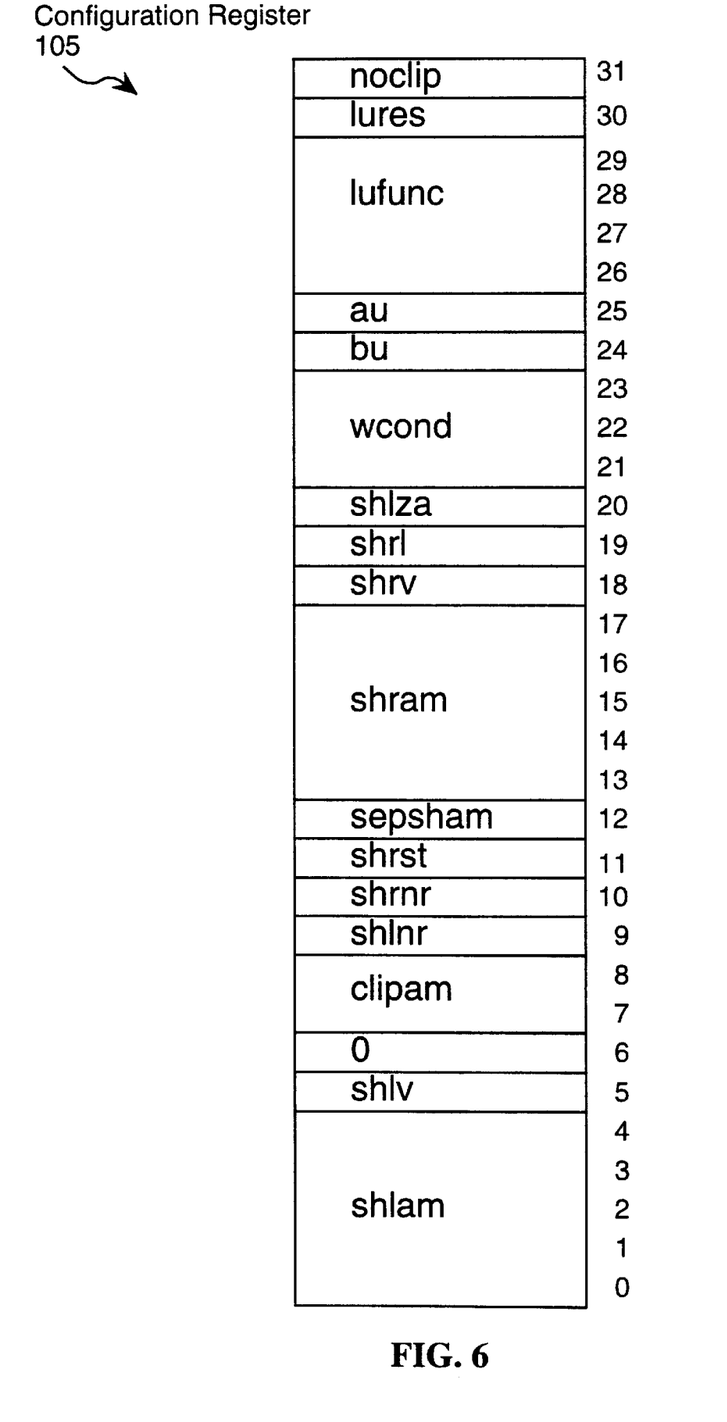
FIG. 6 depicts the format of the control fields stored in a scalar register when used as a configuration register.

FIG. 6 shows the format of a 32-bit wide scalar register 105 when used as a configuration register to control the pipeline configuration of either vector processor 108 or 110. In the next sections we describe the purpose of each of the control fields included in a scalar register when used as a configuration control register. We will describe the fxadd and fxsub instructions together, and separately the fxmul instruction. In this embodiment, these instructions are often used to perform fixed-point arithmetic, and so are sometimes referred to as fixed-point instructions in the text below. Generally, though, the fields of the configuration control register are used as follows:

| Conf Reg Field | Description |
| --- | --- |
| lufunc | specifies logic unit function |
| shlza, shlnr, shlam, shlv | left shifter control |
| shrl, shmr, shrst, shram, shrv, sepsham | right shifter control |
| au, bu | sign extended control |
| wcond | condition logic control |
| lures | clipper input selection |
| noclip, clipam | clipper control |

Figure 7:
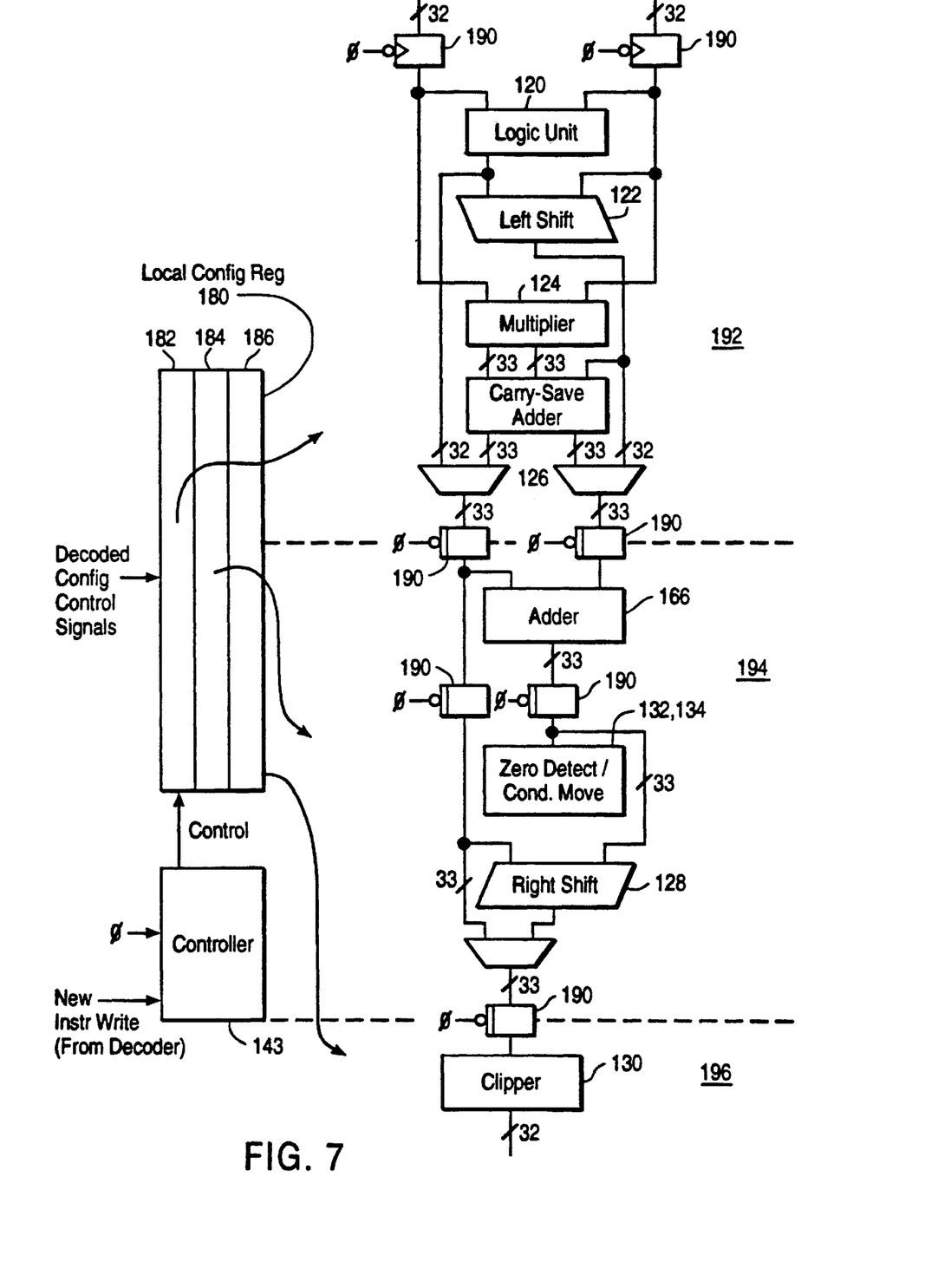
FIG. 7 is a is a schematic representation of the physical pipeline implementation for the second vector processor unit, which can execute configurable add, subtract and multiply instructions.

Referring to FIG. 7, the contents of the configuration register specified by each vector processor instruction are decoded by the instruction decoder 141 (shown in FIG. 2) and the resulting decoded pipeline control signals are stored in a local configuration control signal register 180 that holds the decoded configuration control signal values for up to three pipelined vector instructions. More specifically, configuration register field values are initially stored in a first portion 182 of the local configuration control signal register 180 when execution of a corresponding vector instruction begins, and those values are automatically moved into the second portion 184 of the local configuration register 180 at the beginning of the next instruction cycle, and then are moved into the third portion 186 at the beginning of the following instruction cycle.

Configuration control signal values stored in the first portion 182 of the local configuration control signal register 180 (representing the configuration field values for a first instruction) are used to control the pipeline circuitry for the first portion 192 of the pipeline (which includes the circuitry starting at the logic unit 120 and ending with the carry-save adder 126). The configuration control signal values applied to the second portion of the pipeline are those stored in the second portion 184 of the local configuration control signal register 180 (which includes the circuitry starting at the adder 166 and ending with the right shift unit 128). The configuration control signal values applied to the third portion 196 of the pipeline are those stored in the third portion 186 of the local configuration control signal register 180 (which includes the clipper circuitry 130).

When a vector instruction for a particular vector processor unit is not immediately followed in the following instruction cycles by another vector instruction for the same vector processor unit, at the completion of the last phase of the instruction execution the contents of configuration control signal register 180 are left unchanged. When successive vector instructions are applied to the pipeline of a single vector processor unit 108 or 110 during successive instruction cycles, different sets of configuration control signal values may be simultaneously applied to the different portions of the pipeline.

Each vector processor unit represented by FIG. 7 includes one instance of the controller 143 and local configuration register 180, and N instances of the data processing pipeline 192, 194, 196, where N is the number (eight in the preferred embodiment) of data units processed in parallel by the vector processor unit.

It is noted that the same set of configuration control signals are generated by the instruction decoder 141 for both "complex" and "simple" vector instructions. Simple vector instructions, such as a simple add instruction or a simple XOR instruction are decoded into configuration control signals for controlling all the elements of the pipeline to be used in accordance with opcode of the instruction. For complex vector instructions, the configuration register values stored in the specified scalar register 105 are decoded to produce the configuration control signals. However, in the case of complex vector instructions the values stored in a "configuration register" (i.e., a specified scalar register) represent a partially "pre-decoded" set of configuration control signals, and thus relatively little decoding is required to convert the values in the configuration register fields into the configuration controls signals stored in the local configuration signal register 180.

It is also noted that in the preferred embodiment, any of the scalar registers 105 that are useable as a configuration register for one vector processor unit are also useable as the configuration register for any of the other vector processor units. In this way a programmer has maximum flexibility in terms of the number of configuration registers used to control any particular vector processor unit. In addition, in systems provided with multiple identical or similar vector processor units, the instruction decoder or other associated hardware can route the decoded configuration control signals to any available vector processor unit that is capable of performing the requested instruction.

Fixed-Point Add/Subtract Pipeline

The fxadd and fxsub pipeline, used in the second vector processor unit VP1 110, contains nine stages controlled by a scalar register specified in the rd field of the instruction. FIG. 3 shows the logical structure of the fixed-point add/subtract pipeline. It is noted that both VP0 and VP1 can executed fixed-point add/subtract instructions. Also, FIG. 3 does not show the physical implementation of the pipeline, but rather shows the logical structure from the viewpoint of a programmer writing a program to be executed by the vector processor. The physical implementation of the VP0 pipeline is shown in FIG. 7, and the implementation of VP1 is the same except that it lacks the multiplier and carry save adder.

First stage —Operand Multiplexer

For a vector-vector operation, fxadd.w or fxsub.w, the A input to the pipeline comes from the vd vector register, and the B input to the pipeline comes from the vt vector register. For a vector-scalar operation, fxadd.vs or fxsub.vs, the A input to the pipeline comes from the vd vector register and the B input to the pipeline comes from the rt scalar register. For a scalar-vector operation, fxadd.sv or fxsub.sv, the A input to the pipeline comes from the rt scalar register and the B input to the pipeline comes from the vd vector register. The routing of the appropriate vector and scalar registers to the A and B pipeline inputs is performed by an operand multiplexer 142.

Second stage —Logic Unit

The logic unit 120 can perform any of the sixteen possible bitwise logical operations on A and B under control of the lufunc field, and produces a 32 bit result LUOUT. The default when lufunc is zero is to pass the B input unchanged. See Table 1 for bit encodings of lufunc for the sixteen logical operations.

Third stage —Left shifter

If shlza is clear, the left shifter 122 takes A as the input, otherwise it takes zero as input. If shlv is clear, the shift amount is taken from the shlam field, otherwise the shift amount is taken from the low 5 bits of LUOUT.

If shlnr is clear, a single 1 bit (followed by zeros) is shifted in from the right in the LSB-1 position. This bit effectively adds in ½ LSB for the rounding modes. If shlnr is set, all zeros are shifted in from the right. The left shifter output, SHLOUT, is 32 bits wide.

Fourth stage —Sign Extenders

The fourth stage has two sign extenders 144, 146 that extend SHLOUT and LUOUT to 33 bits to form the ADDA and ADDB adder inputs respectively.

If au is clear, SHLOUT is sign-extended to form ADDA, otherwise SHLOUT is zero-extended to form ADDA.

If bu is clear, LUOUT is sign-extended to form ADDB, otherwise LUOUT is zero-extended to form ADDB.

Fifth stage —Adder

The fifth stage is a 33-bit adder 126. If the operation is a fxadd, ADDA is added to ADDB to give a full 33 bit result, ADDOUT. If the operation is a fxsub, ADDB is subtracted from ADDA to give a 33 bit result, ADDOUT. If either shlv or shrv is set, then the ADDB input is ignored and the adder passes ADDA through unchanged.

Sixth stage —Right Shifter

The right shifter 128 takes the 33-bit adder output, ADDOUT, and shifts it right by up to 31 places giving a 33-bit output SHROUT. It also includes sticky bit logic for round-to-nearest-even rounding.

If shrv is clear then the right shift amount is a constant (shlam or shram) given in the configuration register. If sepsham is clear, shlam gives the constant shift amount, otherwise the separate shram shift amount is used. The default is to have shrv and sepsham clear, so that both left and right shift amounts are specified by the shlam field. If shrv is set, then the low five bits of ADDB (same as low five bits of LUOUT) are used to give the shift amount.

If shrl is clear, the right shift is an arithmetic right shift with sign bits shifted in from the left, otherwise it is a logical right shift with zero bits shifted in form the left.

If shmr is set, no rounding is applied to the right shift output. If shrnr is clear, shrst controls the type of rounding adjustment. A sticky bit value is calculated by OR-ing together all the bits that are shifted off to the right. If shmr is clear and shrst is true, this sticky bit value is logically OR-ed into the least significant bit of the output.

If both shrnr and shrst are clear, then the least significant bit of the shifter output is AND-ed with the sticky bit value. This last, default, case implements the adjustment required for round-to-even rounding if the left shifter added in a round bit in the ½ LSB position and both left and right shift amounts are the same. When the shift amount is zero, the sticky bit must be zero but no modification should be made to the right shifter output. The right shifter circuit 128 includes a check for constant right shift amounts (shrv=0) and turns off rounding in this case, however variable right shifts (shrv=1) of zero places (ADDB[4:0]=0) with shrnr and shrst clear will always reset the low bit of the right shifter output.

Seventh stage —Result Multiplexer

If the lures bit is clear, the 33-bit right shifter output SHROUT is passed by the result multiplexer 150 to the clipper input CLIPIN, otherwise the ADDB value (sign-extended logic unit value) is passed to CLIPIN.

Eighth stage —Clipper

The clipper 130 converts the 33-bit input CLIPIN to a 32-bit result CLIPOUT. It also generates a single bit FLAG which is OR-ed into the appropriate bit of the vsat register.

If noclip is clear, the clipper 130 clips the 33-bit value to an 8-bit, 16-bit, or 32-bit value according to the clipam field. CLIPIN values larger than can be represented in the required number of bits are saturated at the most positive or most negative values possible. The FLAG bit is set if a saturation occurs. This is the normal usage where vsat indicates saturations. See Table 2 for the clip functions associated with each possible clipam value.

If noclip is set, the clipper 130 performs alternate functions, which are listed in Table 3. Note that these functions generate FLAG values which may alter vsat.

The "pass" function passes the low 32 bits of CLIPIN unchanged and always generates a zero FLAG so that vsat is unchanged.

The "overflow" function passes the low 32 bits of CLIPIN unchanged and generates FLAG if there is a signed overflow when truncating CLIPIN from 33 bits to the 32-bit wide CLIPOUT.

The "set if less than" function returns 1 if CLIPIN is negative(MSB=1) or 0 if CLIPIN is positive (MSB=0). FLAG is set in the same manner.

A "set if equal" circuit 134 returns 1 if ADDOUT equals zero, and returns 0 otherwise (note that this function does not depend on SHROUT). FLAG is set in the same manner.

Ninth stage —Conditional Write

The condition circuit 132, in the last stage, decides whether to write CLIPOUT to the vector register dependent on the value of ADDOUT and the setting in the wcond field. Table 4 shows the write operations associated with all the possible values of wcond.

Fixed-Point Multiply Pipeline

The fxmul fixed-point multiply pipeline, utilized in the first vector processor unit VP0 108, contains eight stages controlled by a 32-bit CPU register specified in the rd field of the instruction. FIG. 4 shows the logical structure of the fixed-point multiply pipeline from the viewpoint of a programmer writing a program to be executed by the vector processor.

First stage —Operand Multiplexer

For a vector-vector operation, fxmul.vv, the A input to the pipeline comes from the vd vector register, and the B input to the pipeline comes from the vt vector register. For a vector-scalar operation, fxmul.vs, the A input to the pipeline comes from the vd vector register and the B input to the pipeline comes from the rt scalar register. For a scalar-vector operation, fxmul.sv, the A input to the pipeline comes from the rt scalar register and the B input to the pipeline comes from the vd vector register. The routing of the appropriate vector and scalar registers to the A and B pipeline inputs is performed by an operand multiplexer 160.

Second stage —Sign Extenders

The second stage treats the least significant 16 bits of the A and B inputs as integers and then sign- or zero- extends them, using two sign extenders 162, 164 to form signed 17-bit inputs to the multiplier 124.

If au is clear, MULA[16:0] is A[15:0] sign-extended, otherwise MULA is A[15:0] zero-extended.

If bu is clear, MULB[16:0] is B[15:0] sign-extended, otherwise MULB is B[15:0] zero-extended.

Third stage —Multiplier

The multiplier 124 performs a signed 17-bit by 17-bit multiply of MULA and MULB giving an exact signed 33-bit result MULOUT.

Fourth stage —Round bit

The fourth stage uses the left shifter 122 to generate a rounding bit, ROUND, to be added into the product.

If shlnr is clear, shlam selects the bit position where the round bit will be placed. If shlam contains 1, the round bit will be in bit0. If shlam contains 31, the round bit will be in bit 30.

If shlnr is set or if shlam is zero, no round bit is generated. The shlza and shlv bits must be zero.

Fifth stage —Adder

The fifth stage is a 33-bit adder 166. The ROUND bit is added to the multiplier output MULOUT to give a 33-bit signed result ADDOUT.

Sixth stage —Right Shifter

The right shifter 128 takes the 33-bit adder output, ADDOUT, and shifts it right by up to 31 places giving a 33-bit output SHROUT. It also includes sticky bit logic for round-to-even rounding.

The field shrv must be clear for a fxmul instruction. If sepsham is clear, shlam gives the constant shift amount, otherwise the separate shram shift amount is used. The default is to have sepsham clear, so that both left and right shift amounts are the specified by the shlam field.

If shrl is clear, the right shift is an arithmetic right shift with sign bits shifted in from the left, otherwise it is a logical right shift with zero bits shifted in form the left.

If shrnr is set, no rounding is applied to the right shift output. If shrnr is clear, shrst controls the type of rounding adjustment. A sticky bit value is calculated by OR-ing together all the bits that are shifted off to the right. If shrnr is clear and shrst is set, this sticky bit value is OR-ed into the least significant bit of the output.

If both shrnr and shrst are clear, then the least significant bit of the shifter output is AND-ed with the sticky bit value. This last, default, case implements the adjustment required for round-to-even rounding if the left shifter added in a round bit in the ½ LSB position and both left and right shift amounts are the same. When the shift amount is zero, the sticky bit must be zero but no modification should be made to the right shifter output. The right shifter circuit 128 includes a check for zero right shift amounts and turns off rounding in this case.

Seventh stage —Clipper

The clipper 130 converts the 33-bit SHROUT value to a 32-bit result CLIPOUT. It also generates a single bit FLAG which is OR-ed into the appropriate bit of the vsat register.

If noclip is clear, the clipper clips the 33-bit value to an 8-bit,16-bit, or 32-bit value according to the clipam field.

SHROUT values larger than can be represented in the required number of bits are saturated at the most positive or most negative values possible. The FLAG bit is set if a saturation occurs. This is the normal usage where vsat indicates saturations. See Table 2 for details of clip amounts.

If noclip is set, the clipper performs alternate functions, listed in Table 2, as described above. Note that these alternate functions generate FLAG values that may alter vsat.

The lures field in the configuration register must be equal to zero.

Eighth stage —Conditional Write

The condition circuit 132, in the last stage, decides whether to write CLIPOUT to the vector register dependent on the value of ADDOUT and the setting in the wcond field (see Table 4).

Pipeline Implementation

FIG. 7 shows the preferred implementation of a pipeline capable of performing fxadd, fxsub, and fxmul instructions. In the preferred embodiment all eight pipelines within VP0 have this structure. The eight pipelines in VP1 are similar except they lack the multiplier and the carry-save adder, and so can only perform fxadd and fxsub instructions. Each pipeline has a plurality of functional sectors separated by latches or gates 190 that are enabled at corresponding system clock phases. In the preferred embodiment, each pipeline VP0, VP1 is divided into four functional sectors by latches 190, with data and computational results moving through successive function pipeline sections during each half clock cycle. Note that the first and third pairs of these latches 190 have a "bubble" on their clock input port, indicating they are clocked by the inverse of the system clock signal $\bar{\phi}$, while the second pairs of latches 190 and the last latch 190 are clocked by the system clock signal $\phi$.

It will be appreciated that the number and types of operations that can be configured within a pipeline can be varied, to include for example floating-point arithmetic, or multiple copies of the same type of execution unit, or different selectable communication paths between the execution units, without departing from the inventive concept.

While the present invention has been described with reference to a few specific embodiments, the description is illustrative of the invention and is not to be construed as limiting the invention. Various modifications may occur to those skilled in the art without departing from the true spirit and scope of the invention as defined by the appended claims.

TABLE 1

| lufunc operations. | |
| --- | --- |
| lufunc | LUOUT |
| 0000 | B |
| 0001 | B \| ~A |
| 0010 | A & B |
| 0011 | ~(A ^ B) |
| 0100 | A \| B |
| 0101 | ~0 |
| 0110 | A |
| 0111 | A \| ~B |
| 1000 | B & ~A |
| 1001 | ~A |

TABLE 1-continued lufunc operations.

| lufunc | LUOUT |
|---|---|
| 1010 | 0 |
| 1011 | ~(A \| B) |
| 1100 | A & B |
| 1101 | ~(A & B) |
| 1110 | A & ~B |
| 1111 | ~B |

TABLE 2

Clip amounts with noclip clear.

| noclip | clipam | clip amount |
|---|---|---|
| 0 | 00 | 32b |
| 0 | 01 | 8b |
| 0 | 10 | 16b |
| 0 | 11 | reserved (16b on T0) |

TABLE 3

Set operations with noclip set.

| noclip | clipam | Mnemonic | CLIPOUT | FLAG |
|---|---|---|---|---|
| 1 | 00 | pass | CLIPIN[31:0] | 0 |
| 1 | 01 | overflow | CLIPIN[31:0] | CLIPIN[32] ≠ CLIPIN[31] |
| 1 | 10 | set if less than | CLIPIN[32] | CLIPIN[32] |
| 1 | 11 | set if equal | ADDOUT = 0 | ADDOUT = 0 |

TABLE 4

Conditional write operations.

| wcond | mnemonic | write enable |
|---|---|---|
| 000 | always | 1 |
| 001 | nez | ADDOUT ≠ 0 |
| 010 | gez | ADDOUT ≧ 0 |
| 011 | lez | ADDOUT ≦ 0 |
| 100 | never | 0 |
| 101 | eqz | ADDOUT = 0 |
| 110 | ltz | ADDOUT < 0 |
| 111 | gtz | ADDOUT > 0 |

What is claimed is:

1. A data processor, comprising:

a vector processor unit for performing specified data processing operations, in parallel, on multiple data units;

a multiplicity of registers, each suitable for storing data values as well as pipeline configuration control values;

the vector processor unit including a dynamically configurable set of parallel pipelines, each pipeline having a plurality of data processing elements for sequentially processing a respective data unit in accordance with the pipeline configuration control values stored in a specified one of the registers; wherein the data processing elements in each pipeline are configured in a plurality of functional sectors separated by gates that are enabled at corresponding system clock phases;

an instruction decoder for decoding instructions to be executed by the data processor; each instruction in a subset of the instructions including a configuration register specification field that specifies any one of the registers; the instruction decoder, when decoding any instruction in the subset, utilizing the configuration register specification field in the instruction to determine which of the registers stores the pipeline configuration control values to control operation of the set of parallel pipelines during execution of that instruction; and a local register, associated with the vector processor unit, that stores a plurality of sets of the pipeline configuration control values associated with successive instructions to be executed by the vector processor unit; wherein the local register is configured to simultaneously apply a plurality of the sets of pipeline configuration values in the local register to corresponding different functional sectors of the pipelines in the vector processor unit.

2. The data processor of claim 1, wherein the vector processor unit is a first vector processor unit and the data processor further includes a second vector processor unit that includes a dynamically configurable set of parallel pipelines, each pipeline having a plurality of data processing elements for sequentially processing a respective data unit in accordance with the pipeline configuration control values stored in a specified one of the registers;

wherein each of the registers that can be specified by the configuration register specification field of instructions executed by the first vector processing unit can also be specified by the configuration register specification field of instructions executed by the second vector processing unit.

3. A data processor, comprising:

a vector processor unit for performing specified data processing operations, in parallel, on multiple data units;

a multiplicity of registers, each suitable for storing data values as well as pipeline configuration control values;

the vector processor unit including a dynamically configurable set of parallel pipelines, each pipeline having a plurality of data processing elements for sequentially processing a respective data unit in accordance with the pipeline configuration control values stored in a specified one of the registers; and an instruction decoder for decoding instructions to be executed by the data processor; each instruction in a subset of the instructions including a configuration register specification field that specifies any one of the registers; the instruction decoder, when decoding any instruction in the subset, utilizing the configuration register specification field in the instruction to determine which of the registers stores the pipeline configuration control values to control operation of the set of parallel pipelines during execution of that instruction;

wherein, when any instruction in the subset is being executed by the data processor, the data processing elements in each pipeline are configured in accordance with the pipeline configuration control values stored in the register specified by the configuration register specification field of the instruction being executed.

4. The data processor of claim 3, wherein the vector processor unit is a first vector processor unit and the data processor further includes a second vector processor unit that includes a dynamically configurable set of parallel pipelines, each pipeline having a plurality of data processing elements for sequentially processing a respective data unit in accordance with the pipeline configuration control values stored in a specified one of the registers;

wherein each of the registers that can be specified by the configuration register specification field of instructions executed by the first vector processing unit can also be specified by the configuration register specification field of instructions executed by the second vector processing unit.

5. A method of processing data in a data in a processor having a vector processing unit, the vector processing unit including a plurality of parallel pipelines for performing specified data processing operations, in parallel, on multiple data units; the pipelines including a plurality of functional sectors separated by gates enabled at corresponding system clock phases;

the method comprising the steps of:

dynamically storing, during execution of a program, different sets of pipeline configuration control values in each of a plurality of registers;

decoding instructions to be executed by the data processor, each instruction in a subset of the instructions including a configuration register specification field that specifies any one of the plurality of registers;

for each instruction to be executed that is in the subset, utilizing the configuration register specification field in the instruction to determine which of the plurality of registers stores the pipeline configuration control values to be used during execution of that instruction;

storing in a local register associated with the vector processor unit a plurality of sets of the pipeline configuration control values associated with successive instructions being executed by the data processor in pipelined fashion; and dynamically configuring the set of parallel pipelines by simultaneously applying a plurality of the sets of pipeline configuration values in the local register to corresponding different functional sectors of the pipelines in the vector processor unit.

6. The method of claim 5, wherein the vector processor unit is a first vector processor unit and the data processor further includes a second vector processor unit that includes a dynamically configurable set of parallel pipelines, each pipeline having a plurality of data processing elements for sequentially processing a respective data unit in accordance with the pipeline configuration control values stored in a specified one of the registers;

wherein each of the registers that can be specified by the configuration register specification field of instructions executed by the first vector processing unit can also be specified by the configuration register specification field of instructions executed by the second vector processing unit.

7. A method of processing data in a data processor having a vector processing unit, the vector processing unit including a plurality of parallel pipelines for performing specified data processing operations, in parallel, on multiple data units; the method comprising the steps of:

dynamically storing, during execution of a program, different sets of pipeline configuration control values in each of a plurality of registers;

decoding instructions to be executed by the data processor, each instruction in a subset of the instructions including a configuration register specification field that specifies any one of the plurality of registers;

for each instruction to be executed that is in the subset, utilizing the configuration register specification field in the instruction to determine which of the plurality of registers stores the pipeline configuration control values to be used during execution of that instruction; and dynamically configuring the set of parallel pipelines in accordance with the pipeline configuration control values stored in said determined one of the registers while executing each of the subset of instructions.

8. The method of claim 7, wherein the configuration register specification field specifies one of a set of at least eight registers.

9. The method of claim 7, wherein the vector processor unit is a first vector processor unit and the data processor further includes a second vector processor unit that includes a dynamically configurable set of parallel pipelines, each pipeline having a plurality of data processing elements for sequentially processing a respective data unit in accordance with the pipeline configuration control values stored in a specified one of the registers;

wherein each of the registers that can be specified by the configuration register specification field of instructions executed by the first vector processing unit can also be specified by the configuration register specification field of instructions executed by the second vector processing unit.

* * * * *